United States Patent [19]

Kallenberg

[11] Patent Number: 4,832,482

[45] Date of Patent: May 23, 1989

[54] FILM TRANSPARENCY SLIDE CARRIER AND CONVEYOR SYSTEM FOR FRONT SCREEN PROJECTION SYSTEM

[75] Inventor: Karl J. Kallenberg, Richfield, Minn.

[73] Assignee: Lifetouch National School Studios, Inc., Minneapolis, Minn.

[21] Appl. No.: 152,647

[22] Filed: Feb. 4, 1988

[51] Int. Cl.$^4$ .................... G03B 23/12; G03B 21/64
[52] U.S. Cl. ...................... 353/120; 353/108
[58] Field of Search ............. 353/43, 28, 30, 120, 353/108, 118; 40/158.1, 159.2, 159

[56] References Cited

U.S. PATENT DOCUMENTS

| | | | |
|---|---|---|---|
| 1,921,013 | 4/1924 | Tucker | 353/120 |
| 2,439,350 | 4/1948 | Jablon | 353/108 X |
| 2,727,429 | 12/1955 | Jenkins | . |
| 2,779,116 | 1/1957 | Smith | 40/159 X |
| 3,297,398 | 1/1967 | Donofrio | 353/120 |
| 3,300,886 | 1/1967 | Donofrio | 353/120 X |
| 4,422,745 | 12/1983 | Hopson | . |

FOREIGN PATENT DOCUMENTS

| | | | |
|---|---|---|---|
| 2833521 | 3/1979 | Fed. Rep. of Germany | 353/120 |
| 917352 | 3/1960 | United Kingdom | 40/159.2 |

Primary Examiner—Harry N. Haroian
Attorney, Agent, or Firm—Kinney & Lange

[57] ABSTRACT

A slide carrier and cooperating guide assembly are disclosed which provide for quick location and precise positioning of film transparencies at a determined focus point in a projector. Slide carriers introduced to the guide assembly are readily interchangeable to allow easy selection of a desired film transparency for projection.

8 Claims, 3 Drawing Sheets

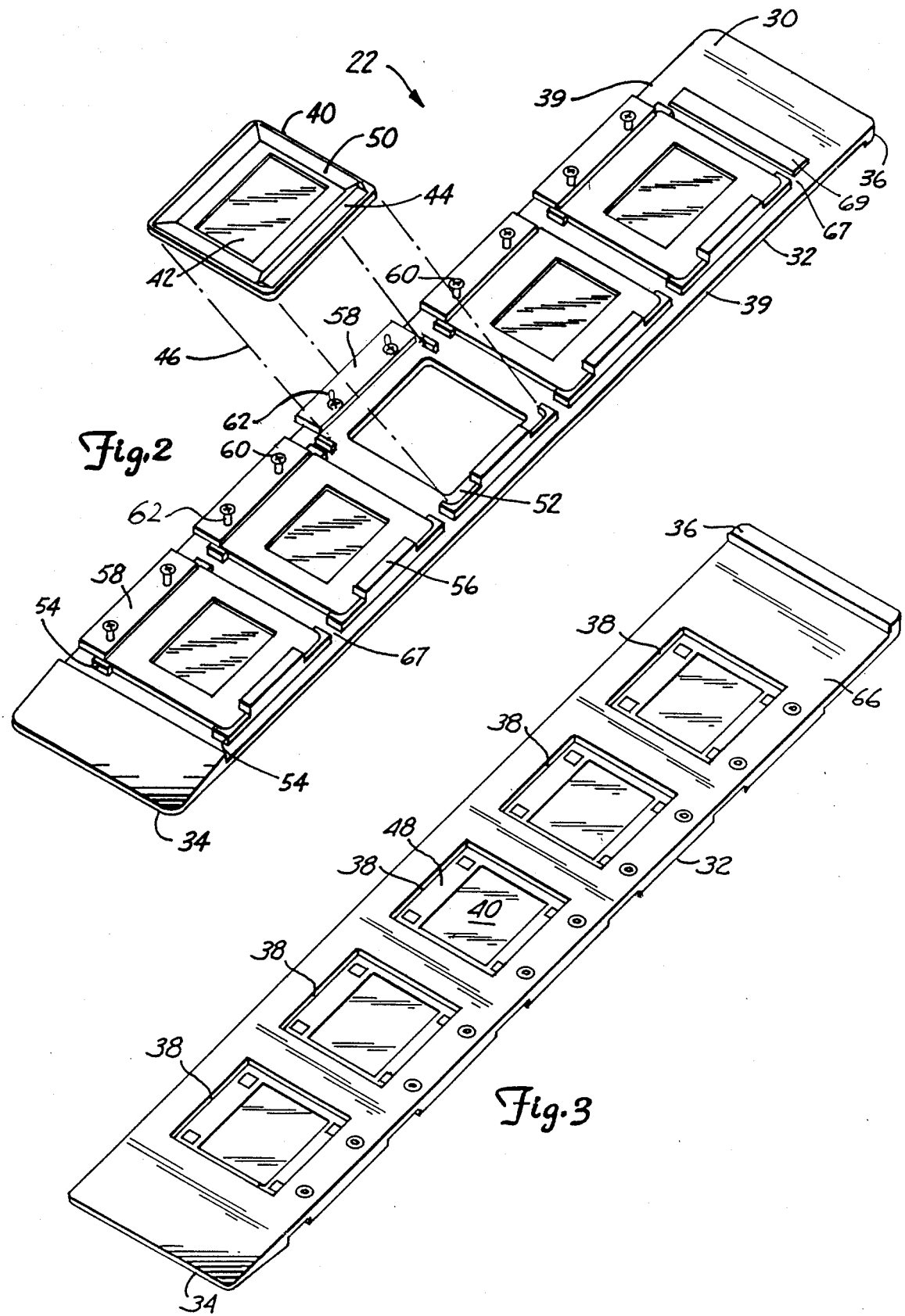

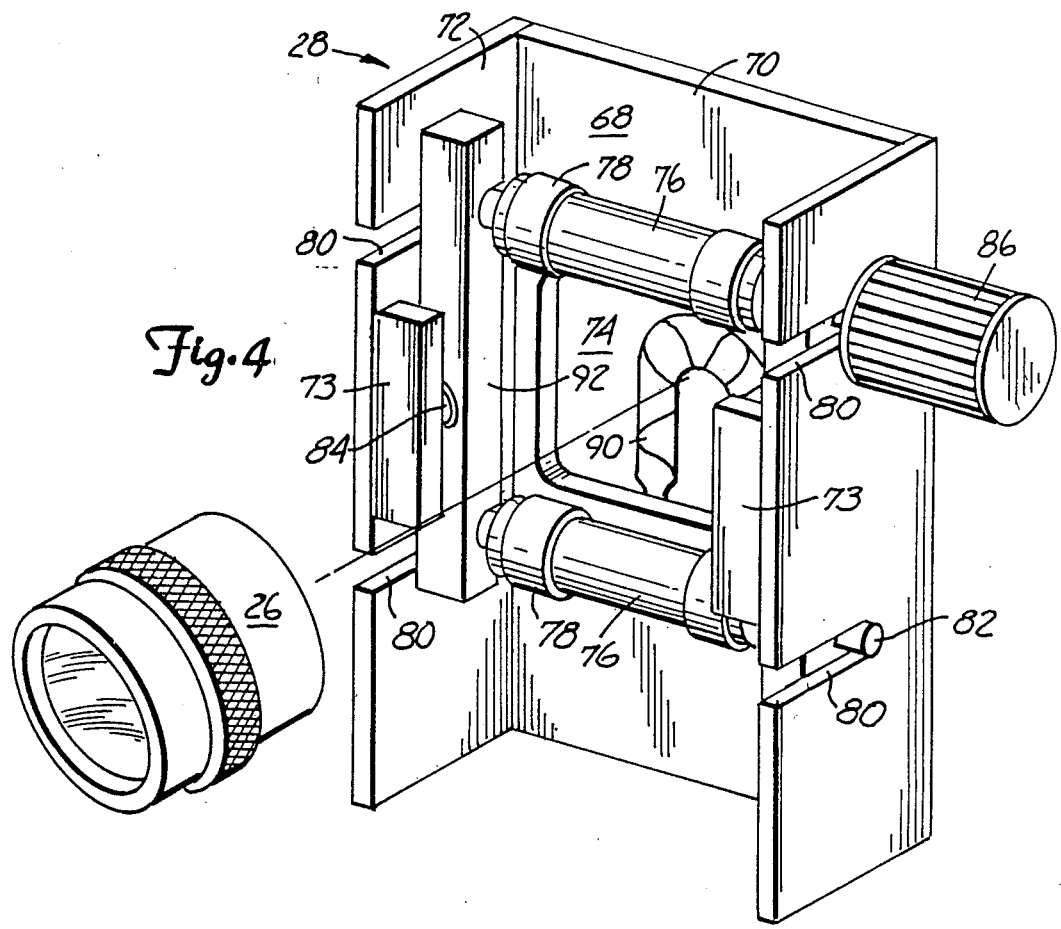
Fig. 4
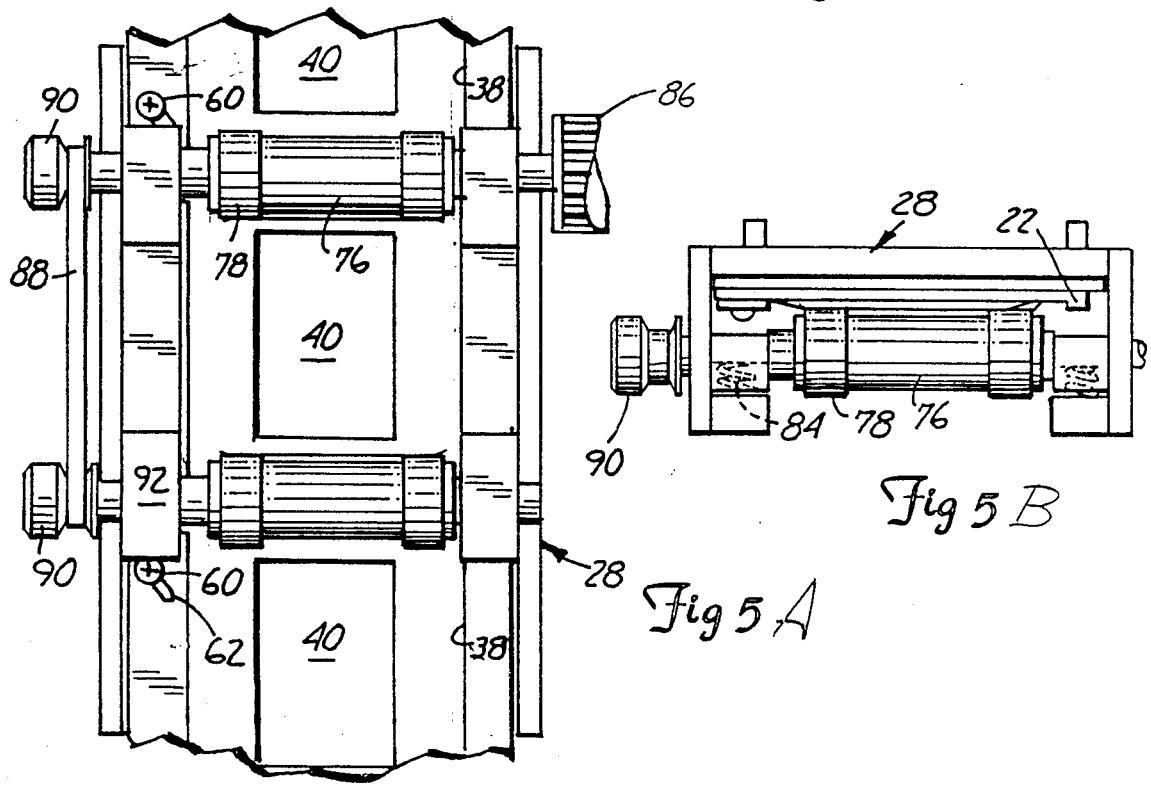
Fig 5A
Fig 5B

FILM TRANSPARENCY SLIDE CARRIER AND CONVEYOR SYSTEM FOR FRONT SCREEN PROJECTION SYSTEM

CROSS-REFERENCE TO RELATED APPLICATIONS

An improved image projector with pivoting mirror used in the front screen projection system of the present invention is shown in U.S. patent application Ser. No. 152,072 by Karl Kallenberg and Ronald Harvey, filed concurrently herewith, the disclosure of which is hereby incorporated by reference.

An improved projector alignment mechanism used in the front screen projection system of the present invention is shown in U.S. application Ser. No. 152,249 by Karl Kallenberg, filed concurrently herewith, the disclosure of which is hereby incorporated by reference.

BACKGROUND OF THE INVENTION

1. Field of the Invention

The present invention relates to a system for transporting and positioning film transparency slides in an image projector used for front screen projection systems.

2. Description of the Prior Art

Front screen projection is a technique wherein composite optical images of real objects and projected images are created. In still photography, it is typically desired to make a photographic portrait of a subject such as a person in what appears to be a neutral or scenic setting. Actual scenery could be constructed or transported to the locality where the photograph is to be made, but this is expensive and inflexible. In front screen projection systems, reflecting screens are provided whereby an image projector may be used to project any one of a plurality of scenery backgrounds as a backdrop for the composite image portrait.

For a school photographer, or other professional photographer, who wishes to utilize scenery background effects, speed and simplicity of use are important. Conventional slide trays do not provide precise positioning of film transparency cases in a projector for projection. Accordingly, minor adjustment of focus is frequently required. Nor do such systems aid in quick location of specific scenery backdrops desired by the photographer for a particular subject.

SUMMARY OF THE INVENTION

The present invention is a film transparency slide carrier and guide assembly system therefor, which cooperate to provide precise positioning of film transparencies mounted in slides at a determined focus point in a projector. The slide carrier in cooperation with positioning wheels in the guide assembly, also provides precise indexing of each slide for full illumination. The slide carriers are readily interchangeable and each is of limited length to allow easy location of a desired film transparency.

Each slide carrier comprises a semi-rigid, elongated rectangular sliding body. The sliding body has a primary face, defined as the side to be oriented toward the illumination source in the projector, and a secondary face to be oriented away from the illumination source. A plurality of apertures are linearly disposed between the elongated edges of the sliding body. The secondary face is adapted to demountably receive slides over each of the apertures in the carrier. The mounted slides are separated to define index strips on the secondary face.

The guide assembly provides an open face slide or channel which embraces the sliding body along its primary face and its elongated edges. This defines a direction of travel of the carrier longitudinally through the guide assembly. A pair of rollers are spaced within the guide assembly to simultaneously engage index strips on each side of each mounted film transparency case as that film transparency case becomes centered in the light passage of the projector for illumination. The rollers are mounted in notch bearings allowing them a freedom of travel in and out of the open slide. Compression springs urge the rollers toward the open face slide to keep the sliding body of the carrier firmly seated in the channel. Because each film transparency case is forced successively into a fixed position, focus can be established once and then need not be changed for successive slides. For the photographer this allows quick location and positioning of a film transparency to project a desired scene without need to adjust focus.

The objects, features and advantages of the present invention will become more apparent from the following detailed description of a preferred embodiment which proceeds with reference to the accompanying drawings.

BRIEF DESCRIPTION OF THE DRAWINGS

FIG. 2 is a perspective view of the secondary face of a film transparency slide carrier;

FIG. 3 is a perspective view of the primary face of a film transparency slide carrier in accordance with the present invention;

FIG. 4 is a perspective view of the guide assembly of the present invention;

FIG. 5A is a front section view of the guide assembly supporting slide carrier.

FIG. 5B is a top section view of the guide assembly supporting a slide carrier.

DETAILED DESCRIPTION OF THE PREFERRED EMBODIMENT

Figure 1:
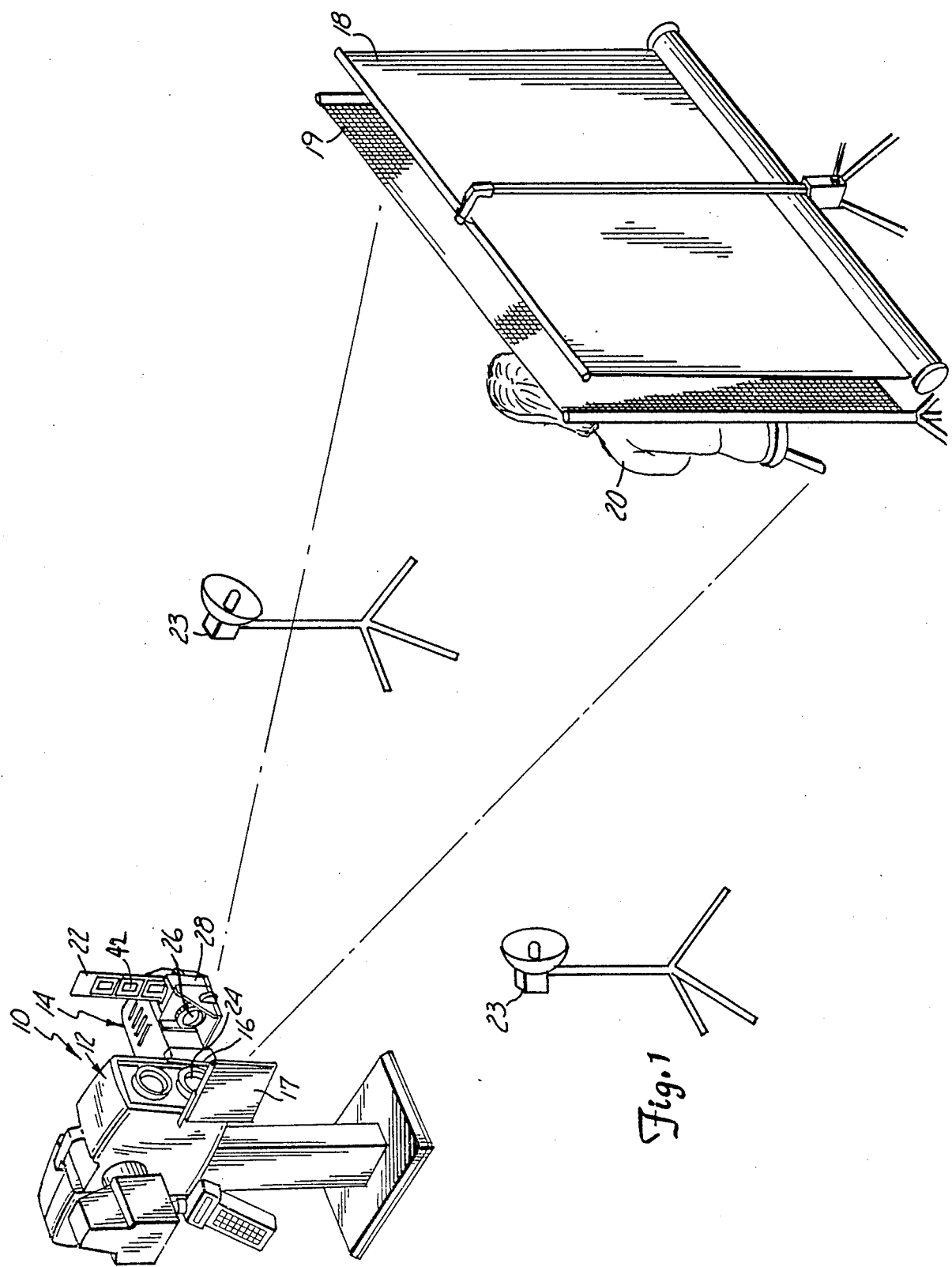
FIG. 1 is a perspective view of a front screen projection system.

FIG. 1 illustrates a front screen projection system 10. Front screen projection system 10 includes a still camera 12 for recording photographic images of composite optical images and a projector 14 for producing backdrop scenery images for the composite optical image. Projector 14 is attached to camera 12 so that the optical axes of projector lens 26 and camera objective lens 24 are coplanar. Beam splitter 16 is disposed perpendicularly to the plane of the optical axes and positioned to make the optical axes projector lens 26 and camera objective lens 24 coaxial from the point where the projected image is reflected off the beam splitter 16 toward reflecting screen 18. An optical baffle 17 absorbs that portion of the projected image which is not reflected off the beam splitter 16 so that no splash effects reach the objective lens of camera 12.

Highly directional reflective screen 18 reflects the image projected by projector 14 back to camera 12 in a narrow solid angle. A black mesh screen 19 is placed immediately in front of screen 18 to act as a filter against light which would impinge on the screen from an angle other than of the projected photographic image scenery backdrop. A photograph subject 20 is placed in front of screen 18 and mesh 19 where it is illuminated by fill lamps 23. The directional nature of screen 18 and black mesh filter 19 limit the amount of light reflecting off screen 18 from fill lamps 23 and from environmental lighting back to camera 12. Directional reflecting screen 18 and black mesh filter 19 are commercially available and do not form a part of the improvement of the present invention. Film transparency slide carrier 22 is shown mounted in guide assembly 28 on projector 14. Guide assembly 28 is disposed in the projector to position individual film transparencies 42 between the projector's illumination sources and the projection lens 26.

FIG. 2 illustrates the component segments of slide carrier 22. Film transparency case carrier 22 includes a sliding body 32, which is typically a semi-rigid, elongated rectangular plastic strip. A leading edge wedge 34 is disposed along one nonelongated edge of sliding body 32 to allow introduction of sliding body 32 to guide assembly 28. Wedge 34 comprises an inclined plane on secondary face 30 tapering to a near razor edge at the end of sliding body 32. At the opposite end or trailing edge of sliding body 32 is a stop bar 36. Stop bar 36 is disposed to prevent passage of sliding body 32 completely through guide assembly 28. In the preferred embodiment, secondary face 30 is directed away from the illumination source by guide assembly 28.

A plurality of apertures 38 are linearly disposed in sliding body 32 parallel to elongated edges 39 of sliding body 32. Each aperture 38 is adapted to receive a slide 40. An unmounted slide 40 and an open aperture 38 are considered first. Each slide 40 is adapted to hold film transparency 42. Slide 40 is a flat thin rectangular case with a base 48 (shown in FIG. 3) and a cover 50. Base 48 is the illuminated face. Cover 50 includes a recessed ledge 44 along one edge thereof which is adapted to mate with the slide retaining mechanism surrounding each aperture 38 in such a way that a slide 40 may be mounted on carrier 22 in only one way. Alternatively, both cover 50 and base 48 may have recessed ledges 44 allowing the slide to be mounted on carrier 22 in either of two orientations.

Open aperture 38 passes completely through slide member 32. Recessed within aperture 38 from secondary face 30 is a support ledge 52. Base 48 of film transparency case 40 rests on support ledge 52 after introduction of a film transparency case 40 to an aperture 38. Aperture 38 is sized to snugly fit a film transparency case 40.

Apertures 38 are rectangular. Raised ribbing 54 brackets the four corners of each aperture 38 on secondary face 30. In the preferred embodiment raised ribbing 54 extends completely along a pair of opposite edges of each aperture 38. The opposite edges chosen are parallel with the direction of travel of sliding body 32 in guide assembly 28 so that the retaining members and mechanisms do not interfere with passage of sliding body 32 in guide assembly 28.

A fixed retaining member 56 projects over a portion of support ledge 52 from one edge of aperture 38. Fixed retaining member 56 is disposed an appropriate distance from recessed ledge 44 to snugly embrace slide 40 along recessed ledge 44 between fixed retaining member 56 and support ledge 52. Accordingly, a slide 40 may be introduced to fixed retaining member 56 along a recessed ledge 44. On the opposite edge of aperture 38 from fixed retaining member 56, a sliding retaining member 58 is disposed. Sliding retaining member 58 is mounted on the secondary face 30 via two screws 60 introduced through slots 62 in sliding retaining member 58. Screws 60 may be adjusted to sufficient tightness to restrict easy movement of sliding retaining member 58. Slots 62 are disposed at about a 45° angle from the direction of travel of sliding body 32 to avoid accidental movement of sliding retaining member 58. Sliding retaining member 58 may be moved completely off aperture 38. When sliding member 58 is moved partially over aperture 38, its spacing from support ledge 52 is such that it will snugly embrace an unindented edge of film transparency case 40.

Dashed lines 46 show the direction of introduction of slide 40 to aperture 38.

An indented index strip 67 is formed by the gap between each mounted slide 40, or as in the case illustrated in the figure, between a slide 40 and index rib 69.

FIG. 3 ilustrates primary face 66 of sliding body 32. Primary face 66 is a flat, smooth rectangular area from leading edge 34 on sliding body 32 to stop bar 36. Stop bar 36 comprises a raised blunt section terminating primary face 66. Again, the plurality of longitudinally disposed apertures 38 is seen. A plurality of slides 40 are disposed in apertures 38 with their bases 48 in part visible through apertures 38.

FIGS. 4 and 5 illustrate guide assembly 28 of the preferred embodiment. Guide assembly 28 includes an open face slide channel 68 which has a smooth back wall 70, and side retaining walls 72. Guide assembly 28 will be mounted in projector 14 (shown in FIG. 1) so that aperture 74 in back wall 70 is aligned with projection lens 26 and illumination source 90 within projector 14. Retaining walls 72 include notch bearings 80. Notch bearings 80 are adapted to receive axles 82 whereby rollers 76 and roller wheels 78 may be supported between the retaining walls 72. Retaining walls 72 are spaced to admit sliding body 32 along elongated edges 39. Accordingly, slide carrier 22 is admitted to guide assembly 28 at leading edge 34, introducing each aperture 38 successively to position over aperture 74. Primary face 66 will abut and slide along back wall 70. Notch bearings 80 permit rollers 76 a degree of freedom of travel perpendicular to the direction of travel of slide carrier 22 in and out of in slide 68. Compression springs 84 are disposed on the inside of support walls 73 to apply force to bars 92 to urge rollers 76 toward back wall 70. Accordingly rollers 76 will press sliding body 32 against back wall 70. Leading edge wedge 34 on the secondary face 30 will displace the upper roller 76 from back wall 70 and later roller 76 into guide assembly 28 to allow admittance of slide carrier 22 to guide assembly 28. Stop bar 36 will abut the top edge of back wall 70 to restrain travel of slide carrier 22 completely through guide assembly 28.

Rollers 76 are spaced to engage index strips 67. Accordingly, each film transparency case is successively supported in position over aperture 74 by rollers 76 by allowing rollers 76 to slip part way into index strip 67 to support carrier 22.

Positioning knob 86 allows the operator to rotate rollers 76 to move carrier 22 in both directions through guide assembly 28. Roller 76 is coupled to roller 76 by timing belt 88.

FIG. 5A illustrates a film transparency case carrier 22 mounted in guide assembly 28. Timing belt 88 rigidly couples the motion of rollers 76 by pullys 90. Accordingly, actuation of positioning knob 86 moves both rollers in conjunction. Rollers 76 engage index strips 67 to position a slide 40 mounted in aperture 38 over aperture 74. Actuation of positioning knob 86 allows advance or retreat to an adjacent slide 40. Each slide 40 is successively introduced to the same position within guide assembly 28 obviating any need for refocus.

FIG. 5B illustrates displacement of a roller 76 by slide carrier 22.

The present invention overcomes the deficiencies in the prior art by providing an improved slide carrier 22. The geometry of slide carrier 22 in cooperation with guide assembly 28 forces introduction of slide carrier 22 to guide assembly 28 in the proper orientation for illumination. That is, the geometry defines a primary or illuminated side 66 and a secondary or projection side 30 of slide carrier 22. Slide carrier 22 itself may be readily removed from guide assembly 28 and another carrier substituted therefor to allow quick location of a desired background scene.

Slide carrier 22 also allows for substitution and rearrangement of slides 40 on slide carrier 22. Apertures 38 are provided in slide carrier 22 over which slides 40 may be mounted. The geometry of slides 40 and the retaining members disposed around each aperture may be adapted to cooperate to insure that each slide 40 is mounted on slide carrier 22 so that the base 48 will face the illuminating source when slide carrier 22 is introduced to guide assembly 28.

Each slide 40, when mounted on slide carrier 22, rises above secondary 30 face of the carrier 22. Separation is provided so that a recessed gap will appear on secondary face 30 between each slide 40. These gaps will cooperate with guide assembly 28 to provide positioning of each slide for illumination by the projector.

A photographer using the present invention may quickly locate a desired slide by examination of slide carriers being used. Removal of the previous slide carrier in the projector and its replacement is quick and easy.

Although the present invention has been described with reference to preferred embodiments, workers skilled in the art will recognize that changes may be made in form and detail without departing from the spirit and scope of the invention.

What is claimed is:

1. A carrier for a plurality of film transparency slides comprising:
    at least a first elongated rectangular sliding body having parallel first and second outside faces and a plurality of apertures through the first and second outside faces, wherein the apertures are linearly aligned in the direction of elongation of the slide member;
    frame means disposed on the second outside face of each sliding body in relationship with each aperture for engaging a slide to position the film transparency mounted in the slide adjacent to its respective aperture whereby luminous flux may pass through the film transparency and the aperture; and
    flange means associated with each aperture for demountably gripping the slide in the framing means, each flange means including;
        supporting ledge means disposed inwardly from the peripheral edge of each aperture and being recessed from the second face for supporting a slide mounted over and partially in the aperture,
        fixed retaining means disposed on the second face for gripping an edge of the slide between itself and the supporting ledge means, and
        movable retaining means disposed on the second face with respect to each aperture to be slid over the edge of the slide at a point opposite the point on the edge where the fixed retaining means grips the slide for locking the slide over the aperture.

2. The slide carrier as defined in claim 1 wherein the framing means further comprises:
    portions of the peripheral edge of each aperture between the recessed supporting ledge means and the second face; and
    raised ribbing disposed on the second face directly adjacent the peripheral edges defining the plurality of apertures;
    whereby a slide is snugly retained with respect to an aperture within the peripheral edges and raised ribbing.

3. The slide carrier as defined in claim 1 further comprising means for engaging a slide in a particular orientation as the slide is mounted on the slide carrier.

4. The slide carrier as defined in claim 2, wherein one outside face of the sliding body is beveled adjacent one of two edges of the sliding body perpendicular to the direction of elongation of the sliding body.

5. The film transparency carrier as defined in claim 4 wherein the sliding body further comprises a stop bar projecting from the sliding body near the edge of the sliding body opposite the edge adjacent the beveled section of the sliding body.

6. The slide carrier as defined in claim 3, wherein the framing means further comprises:
    portions of the peripheral edges of the apertures, between the recessed supporting ledge means and the second face; and
    raised ribbing disposed on the second face directly adjacent the peripheral edges defining the plurality of apertures;
    whereby a slide is snugly retained with respect to an aperture within the peripheral edges and raised ribbing.

7. The slide carrier as defined in claim 6, wherein one outside face of the sliding body is beveled adjacent one of two edges of the sliding body perpendicular to the direction of elongation of the sliding body.

8. The slide carrier as defined in claim 7, wherein the sliding body further comprises a stop bar projecting from the slide member near the edge of the sliding body opposite the edge adjacent the beveled face of the slide member.

* * * * *

UNITED STATES PATENT AND TRADEMARK OFFICE
CERTIFICATE OF CORRECTION

PATENT NO. : 4,832,482
DATED : May 23, 1989
INVENTOR(S) : Karl J. Kallenberg

It is certified that error appears in the above-identified patent and that said Letters Patent is hereby corrected as shown below:

Title page:

In the References Cited Section, under U.S. PATENT DOCUMENTS, delete:

1,921,013    4/1924    Tucker .................. 353/120

In the References Cited Section, under OTHER PUBLICATIONS, add:

T921,013    4/1974    Tucker .................. 353/120

Signed and Sealed this

Twentieth Day of November, 1990

*Attest:*

HARRY F. MANBECK, JR.

*Attesting Officer*    *Commissioner of Patents and Trademarks*